Figure 1:
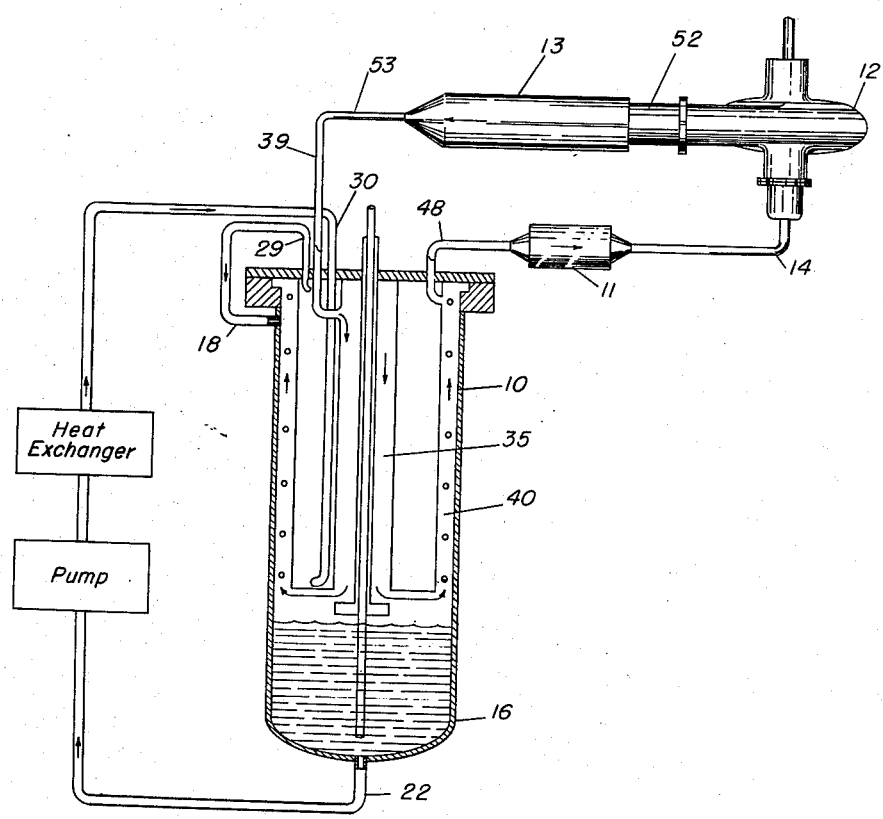

Nov. 22, 1960

L. D. P. KING 2,961,391

WATER BOILER REACTOR

Filed July 27, 1956

3 Sheets-Sheet 1

WITNESSES:

INVENTOR.
L.D.P. King
BY

United States Patent Office 2,961,391
Patented Nov. 22, 1960

2,961,391

WATER BOILER REACTOR

L. D. Percival King, Los Alamos, N. Mex., assignor to the United States of America as represented by the United States Atomic Energy Commission Filed July 27, 1956, Ser. No. 600,641

2 Claims. (Cl. 204—193.2)

The present invention is related to homogeneous nuclear reactors utilizing liquid fuels and more particularly to improvements in water boiler type homogeneous reactors.

The water boiler type reactors have proved to be excellent general purpose research tools, since they have the advantages of (1) inherent safety due to the large negative temperature reactivity and power coefficients; (2) small size along with low power and uranium requirements for comparable neutron fluxes; (3) no problems of replacing burned-out fuel elements; (4) low cost and simplicity of design; and (5) ease of rapid shut-down and start-up operations. However, reactors of this type have disadvantages such as flux limitations and low specific power. Further, in some water boiler type reactors the problem of uranium from the evolved gases being deposited on the surfaces outside of the critical region has resulted in higher uranium inventories and the requirement of complete shut downs for the removal of uranium from the gas handling system.

The improved reactor system of the present invention results in neutron fluxes many times greater than the neutron fluxes of prior art water boiler type reactors, and with substantial increases in specific power. The improved reactor system of the present invention provides a threefold increase in area of the solution-gas interface, thereby reducing the amount of uranium entrained in the solution vapor, provides a cylindrical vessel, thereby allowing for emergency expansion without affecting the solution-gas interface area, provides additional heat exchanger area including a vessel wall cooling jacket, thereby reducing the temperature of the surrounding reflector, provides neutron shielding within the vessel but above the critical region which also serves as a means for condensing gases and provides facilities for the irradiation of samples, provides for increasing the circulation rate in the recombination system, and provides a means for overcoming the problem of the depositing of uranium on the reactor surfaces by providing adequate wash-down features within the reactor, thereby preventing a material loss of fissionable material within the system and the creation of neutron-hot areas outside of the reactor vessel. These combined improvements not only result in a safer reactor research facility but also function to materially increase the neutron flux without requiring a substantial increase in fissionable isotope inventory.

The preferred embodiment described herein is specific to a power level of about 400 kilowatts, at which the central neutron flux would be about $1.5 \times 10^{13}$ neutrons per square cm. per sec., and provides for the removal of heat from the critical region by the conventional convection current system of the water boiler type reactor. The upper portion of the reactor vessel is occupied by a reflux and spray condenser and a cooling water container, designed to prevent the entrainment of solution spray in the gas circulating system and also serve as a radiation shield. The radiolytic gases are circulated up along the inside surface of the reactor vessel, i.e., through the spray condensing channel, out of the vessel into a closed system, through an entrainment trap, a pump, and catalyst chamber, and back into the reactor vessel through the reflux condensing channel, and across the surface of the liquid fuel. In this manner a washdown action is provided in the spray condensing channel by the condensation of the water vapor on the surfaces of the cooling water container and vessel wall. Condensation of the water vapor in the spray condensing channel and on the bottom of the cooling water container, as well as the directing of the gas flow across the surface of the liquid fuel, materially reduces the depositing of uranium on the exposed surfaces of components of the reactor system. This system also dilutes the radiolytic hydrogen and oxygen gases at all points in the system, thus increasing the safety by eliminating possible explosive regions.

Therefore, it is an object of the present invention to provide an improved water boiler type reactor system which has an increased neutron flux without materially increasing the fissionable material inventory.

Another object of the present invention is to provide a method and apparatus for circulating, recombining and condensing the radiolytic gases formed during the operation of a homogeneous nuclear reactor in a manner which substantially prevents the loss of uranium.

A further object of the present invention is to provide an improved water boiler type reactor which permits operation at higher specific power and which reduces the radiation hazards by providing a more compact arrangement of components within the radiation shield.

Figure 2:
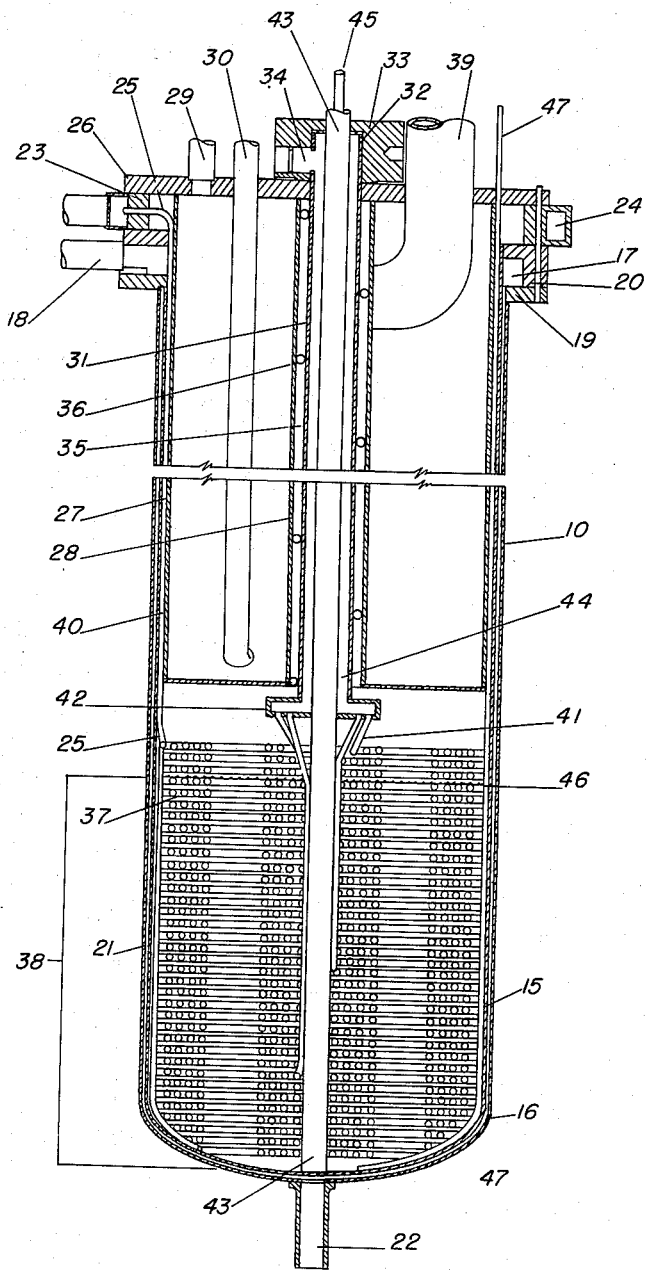
Figure 3:
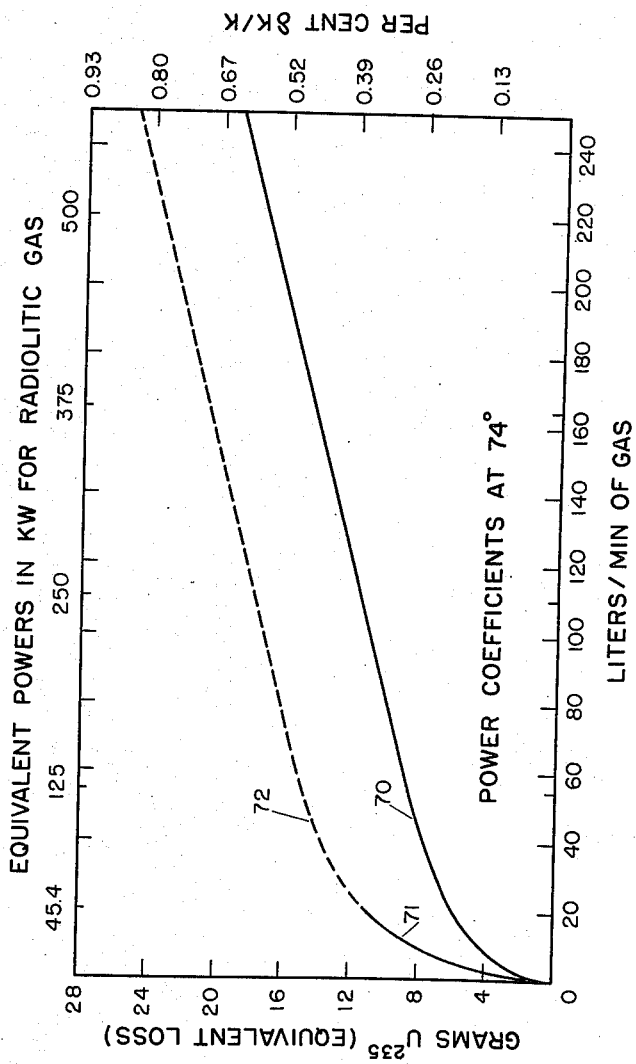

Other objects and advantages of the present invention will become more apparent from the following description including drawings, hereby made a part of the specification, wherein:

Figure 1 is a partial section schematic showing the reactor system of the present invention, Figure 2 is a sectional view of the reactor vessel, and Figure 3 shows the effect of vapor and radiolytic gas at various power levels and the loss of reactivity resulting from their evolution in existing water-boiler type reactors.

SUMMARY OF APPROXIMATE REACTOR SPECIFICATIONS OF PREFERRED EMBODIMENT

| | |
|---|---|
| Type | Homogeneous. |
| Neutron energy | Thermal. |
| Power | 400 kw. |
| Fuel | Enriched uranyl sulfate. |
| Critical mass | ~ 1.2 kg. of $U^{235}$. |
| Power density at operating temp. | 26 kw./liter. |
| Operating temperature | 80–85° C. |
| Moderator | Water. |
| Reflector | Graphite. |
| Vessel: | |
|    Overall height | 66 inches. |
|    Volume of critical region | 20 liters. |
|    Height of liquid fuel | 12.7 inches (cold); 13.5 inches (hot). |
|    Diameter of critical region | 12 inches. |
| Heat exchanger: | |
|    Area—19,000 sq. cm. | 36 spiral coils each 14 turns and 11½ ft. long in solution. |
|    Composition | Stainless steel tubing, 20 mil wall. |
|    Coolant | Water. |
|    Coolant temperature—inlet | Room temperature. |
|    Coolant pressure | 150 p.s.i. |
| Fuel circulation | Convection. |
| Control | Central control rod. |
| Flux in critical region: Average | $10^{13}$ n/sq. cm./sec. |
| Gas circulation rate | 2000 liters/min. |
| Coolant container water: | |
|    Temperature | 15° C. |
| Coolant jacket water flow | Flow rate adjustable to maintain surrounding reflector at room temperature. |
| Catalyst chamber inlet temp. | Room temperature. |
| Catalyst chamber outlet temp. | ~ 200° C. |
| Catalyst bed temperature | Less than 450° C. |

Apparatus

The preferred embodiment of the reactor system of the present invention is shown schematically in Figure 1, and consists of a reactor 10, an entrainment trap 11, a pump 12, a catalyst chamber 13, and conduit 14 which connects these components with each other and with the spray-condensing channel 40 and reflux-condensing channel 35.

The reactor 10 is shown in detail in Figure 2. It consists of a reactor vessel 15 which is surrounded by a cooling jacket 16. The cooling jacket 16 is connected through a coolant channel 17 to a coolant inlet pipe 18. The channel 17 is formed by flange 19 of the cooling jacket 16 and vessel flange 20, extends around the top of vessel 15, and is connected to cooling passage 21 which completely surrounds the vessel 15. The cooling passage 21 is connected to outlet 22 at the bottom of the vessel 15. Outlet 22 is connected, for example, to the pump and heat exchanger shown diagrammatically in Figure 1.

To the upper flange 20 of vessel 15 is sealed an input manifold 23 containing a circular manifold channel 24 which is connected to a plurality of heat exchanger coolant inlet pipes 25. Sealed to the input manifold 23 is a top plate assembly 26 which seals the top opening of the vessel 15. Sealed to and supported by the top plate assembly 26 is a closed cooling water container 27 which extends downwardly into the vessel 15 for a distance of approximately four and one-half feet in the preferred embodiment. The container 27 is cylindrical in form, has an outside diameter less than the inside diameter of the vessel 15, and has a central vertical aperture 28, thereby forming a hollow cylindrical container which is sealed from the interior of vessel 15. The bottom portion of the interior of the container 27 is connected to the outside through an inlet pipe 30, which is sealed to top plate 26 and is connected, for example, to a heat exchanger and circulating pump shown diagrammatically in Figure 1. The top of the container 27 is connected to water outlet pipe 29 which extends upwardly through top plate assembly 26. The water outlet pipe 29 is connected to the water inlet pipe 18 of cooling jacket 16.

Extending downwardly through top-plate assembly 26 and aperture 28 to a point below the container 27 is a heat exchanger outlet pipe 31. Outlet pipe 31 is located in the center of vessel 15 and extends through and is sealed to top plate assembly 26. The upper portion 32 of the outlet pipe 31 is sealed to an outlet manifold 33 through which it is connected to outlet channel 34. The outlet channel 34 is connected to any standard heat exchanger means which will cool the water, or may be connected to a drain.

Between the outside surface of outlet pipe 31 and the aperture 28 in the container 27 is a reflux condensing channel 35. A spiral cooling coil 36 is located in reflux condensing channel 35 to aid in condensing recombined gases. The cooling coil 36 is connected to any suitable supply of cooling water. The bottom of reflux condensing channel 35 connects to the vapor region above the heat exchanger 37 and the critical region 38. The reflux condensing channel 35 is connected at its top to catalyst chamber connecting pipe 39 which extends through top plate assembly 26 to catalyst chamber outlet pipe 53. The heat-exchanger inlet pipes 25 spiral down the spray-condensing channel 40 to the heat exchanger 37 located in the critical region 38 of the vessel 15. The outlet pipes 41 of the heat exchanger 37 are connected to a common chamber 42 located at the bottom of and connected to the heat exchanger outlet pipe 31. The chamber 42 is designed to provide a flow-directing baffle which directs the gas passing down reflux condensing channel 35 across the bottom of container 27 and directs the gases evolved from the solution toward the spray condensing channel 40.

Extending through outlet manifold 33, downwardly through outlet pipe 31, chamber 42 and heat exchanger 37, is a control rod thimble 43 which terminates at the bottom of the vessel 15. The thimble 43 is sealed to the outlet manifold 33 and is of smaller diameter than the outlet pipe 31 to provide a channel 44 from the chamber 42 to the outlet manifold 33 for the passage of the heated water from the heat exchanger 37. The thimble is welded to the bottom of chamber 42. A control rod 45 is movably supported within the thimble 43 by a conventional control rod mechanism (not shown).

The normal solution level during operation is indicated at 46, and is slightly below the top of the heat exchanger 37 to provide additional vapor cooling area. That portion of the heat exchanger 37 above the liquid level aids in trapping spray and in condensing water vapor. Thus the reactor of the system of the present invention contains the spray condensing and reflux condensing channels which heretofore have been located external to the reactor vessel. This arrangement provides a more compact unit, decreases the shielding requirements for the research facility and simplifies the condensing apparatus.

A solution sampling tube 47 is provided which extends to the bottom of the reactor vessel 15 by which additional solution may be added and which provides a means for monitoring the solution composition. The spray-condensing channel 40 is connected to outlet pipe 48 (see Fig. 1) which is connected to entrainment trap 11. The entrainment trap 11 is for the purpose of collecting any uranium entrained within the gas evolved in the reactor and is included as a safety feature to prevent uranium from reaching other portions of the system should there be an unpredicted excursion during the operation of the reactor. For normal operation such a device is not necessary, since the washback feature in the spray condensing channel 40 will return the entrained uranium to the critical region. The trap 11 is connected through a standard, sealed, centrifugal pump 12 to a catalyst chamber 13. Catalyst chamber 13 is described in detail in U.S. Patent 2,943,921, a patent issued on an application divided from that herein. It may be summarized here by stating that it consists of a cylindrical housing closed at the ends by ring plates and divided by a solid baffle plate into a first, shorter longitudinal section at the intake end and a second, longer longitudinal section at the output end, the baffle plate extending less than the full inside diameter of the housing to define a peripheral passage inside the housing wall. In the first section, an annular array of steel shot defines a peripheral passage which is continuous with that around the baffle, and an annular catalyst array in the second section likewise defines a peripheral passage registering with the other two. Each annulus also defines a central cavity terminated at one end by the baffle plate, the opposite end registering with the opening in the appropriate ring plate for connection to external tubing. The catalyst array is subdivided into an outer annulus of unplatinized alumina pellets adjacent the peripheral passage and an inner annulus of platinized alumina pellets. In operation the incoming gases are forced from the input central cavity through the annulus of steel shot into the continuous peripheral passage, through both alumina annuli to the output central cavity, and then out the exit. The steel shot serves as an explosion trap and flashback shield, quenching any possible hydrogen-oxygen combustion, and the unplatinized alumina annulus similarly prevents flashback, both serving to prevent the spread of any such combustion to other parts of the reactor system. The platinized alumina pellets catalyze the reaction of hydrogen and oxygen to form water vapor.

The gas outlet aperture 53 of the catalyst chamber 13 is connected to connecting pipe 39 (see Figure 1) of the reactor. The system described is sealed so that if desirable it may be pressurized, for example to a pressure of 3 atmospheres, to reduce the effect of water vapor and radiolytic gas evolved by reducing the size of the bubbles formed in the liquid fuel.

Critical region and fuels

Various liquid fuels, such as, for example, solutions or slurries, may be used in the reactor system of the present invention. These include, but are not limited to, enriched uranyl nitrate and uranyl sulphate solutions in ordinary or heavy water, as well as liquid fuels including plutonium as the fissionable material. Only one specific example will be given, although no limitation is thereby intended.

A solution of enriched uranyl nitrate in ordinary water having of the order of 0.54 molar solution is the preferred liquid fuel for the reactor of the present invention. This type of liquid fuel has been used in homogeneous type reactors of the prior art, and many of its characteristics are known (see Review of Scientific Instruments, vol. 22, No. 7, pages 489–499).

The fissionable component of the preferred fuel is uranium enriched in the isotope $U^{235}$ to a value of about 90 percent. The reflector, which surrounds the reactor (not shown) is preferably graphite.

The configuration of the critical region is, as a close approximation, a cylinder 12 inches in diameter and 12 inches high. Other critical geometry dimensions may be utilized without departing from the scope of the present invention.

Utilizing the preferred fuel solution, the average power output would be approximately 400 kw. with a maximum thermal flux of the order of $10^{13}$ neutrons/cm.$^2$/sec. with an average specific power per liter of about 26 kw. It should be noted that the quantities and proportions pointed out hereinbefore are only approximate and that the calculation of the exact quantities and proportions depends upon flux desired, desired operating power level, the size of the reactor, the amount of effective poisoning components in the solution, and the moderator and reflector utilized.

Operation

The reactor of the present invention has a normal solution level 46, which is slightly below the upper extremity of the heat exchanger 37. With the control rod 45 removed so that a critical nuclear reaction is taking place within the solution, a portion of the water contained in the solution becomes radiolytically dissociated to form hydrogen and oxygen gas. These evolved gases pass up spray condensing channel 40 in which any water vapor present is condensed by the coolant inlet pipes 25, the cooling water container 27 and the cooled wall of the vessel 15 and is thereby returned to the solution. The dissociated gases pass through gas outlet pipe 48, through the entrainment trap 11 and then into the pump 12. The pump 12 forces the dissociated moderater gases through the inlet pipe 52 of the catalyst chamber 13 where, by catalytic action, the hydrogen and oxygen are recombined to form water vapor. The water vapor then passes through outlet 53 through gas inlet pipe 39 and into reflux condensing channel 35. The water vapor in channel 35 is condensed upon spiral coolant coil 36 and the cooled wall of container 27 and is returned to the reactor solution. Any gas which is not recombined or any vapor which is not condensed flows down channel 35 and is directed outwardly by baffle 42. The outwardly directed gases prevent the depositing of uranium upon the bottom surfaces of the coolant container 27 and sweep the gases evolved from the reactor solution into the spray condensing channel 40 and prevent any region of the reactor from having high concentrations of explosive gas.

This arrangement and association of components materially increases the neutron flux available without materially increasing the uranium inventory. Figure 3 compares the power coefficients for normal operation of existing water boiler type reactors with appreciable radiolytic gas production to the boiling condition when most of the gas is water vapor. Curve 70 of Figure 3 is a plot of the amount of water vapor in terms of equivalent grams of $U^{235}$ loss and the loss in reactivity i.e., percent of $\delta K/K$. It is apparent from curve 70 that the amount of evolved vapor rises rapidly at the lower power operation but increases at a lower but steadily increasing rate at higher power levels. Curve 71 is a plot of equivalent grams $U^{235}$ and percent $\delta K/K$ for various equivalent power levels. Curve 71 rises more rapidly than curve 70 at lower power levels, thereby indicating that radiolytic gas initially has a more severe effect upon the reactivity than vapor production due to the smaller initial bubble size of the radiolytic gas. However, as can be seen by the upper extrapolation portion 72 of curve 71, radiolytic gas has a similar effect to vapor at the higher power levels when the bubble sizes become comparable. Thus, the effect of vapor and radiolytic bubbles in the liquid fuel is not a limitation on the power level as had previously been considered, and it is therefore apparent that the order of a 10-fold increase in power density and neutron flux may be attained, provided the gas handling and heat removal system of the present invention is utilized. The specific power of the reactor is also increased. These two results are obtained by the cooperation of four factors. The first of these factors is the use of a cylindrical critical region. By using a cylindrical critical region the solution-gas interface area is increased by a factor of three at operating temperatures, thereby reducing the velocity of the evolved gases and making it possible to direct their flow into spray condensing channel 40 of greatly increased surface area. The utilization of coolant water container 27 makes it possible to create a wash-back action in the spray condensing channel 40, aids in the condensation of recombined gases in reflux condensing channel 35, and provides a cool surface adjacent the solution surface to materially aid in preventing the loss of uranium from the solution. Further, the coolant container 27 furnishes a shield between the critical region and the inlet and outlet manifolds of the reactor and the control rod apparatus located above the reactor and provides a region for irradiation purposes. The gas circulation rate is increased by a facture of 20, thereby making it possible to operate at substantially higher power densities.

The spiral cooling coil 36 and coolant container 27 of the reflux condensing channel 35 aid in condensing water vapor by providing a larger surface area. The baffle 42 directs the gases outwardly, which aids in sweeping evolved gases toward the spray condensing channel 40 and minimizes evaporation and disturbance of the liquid surface.

The coolant jacket 16 has a double function. The upper portion of the jacket aids the condensing of water vapor in spray condensing channel 40. Thus, the spray condensing channel 40 has an outer cooled surface, i.e., the vessel wall cooled by jacket 16, and an inner cooled surface, i.e., the wall of container 27, and, further, has heat exchanger inlet pipes 25 which carry cool water. Further, coolant jacket 16 provides a means for keeping the reflector surrounding the critical region at room temperature.

These improvements combine to reduce the amount of water vapor and prevent the entrainment of uranium in the gas passing out of the reactor, thereby improving the action of the catalytic recombiner chamber 13, since only radiolytic gas passes over the catalyst. Thus, the recombiner efficiency is increased. The catalyst chamber 13 is separated from condensing apparatus for a two-fold purpose: (1) Its design is simplified and made easily accessible and overcomes the necessity for preheating to drive off water vapor. (2) The circulating gas stream can be utilized by a suitable fission product trap such as the entrainment trap 11 for use as a strong gamma source with the presence of only a few delayed neutrons.

The arrangement in the catalyst chamber materially increases the safety factor of the reactor system. By preventing the possibility of a flashback, both through the use of the outer alumina annulus and the annulus of steel shot, the danger of igniting an explosive hydrogen-oxygen mixture in other parts of the system is prevented.

Therefore it is apparent that the reactor systems of the present invention provide a simplified research reactor facility, which is compact in arrangement, increases the safety of the facility, will produce higher average neutron fluxes, and may be operated at higher specific powers. While presently preferred embodiments of the invention have been described, it is clear that many other modifications such as pressurizing or use of heavy water moderators may be made without departing from the scope of the invention. Therefore the present invention is not limited by the foregoing description, but solely by the appended claims.

What is claimed is:

1. A homogeneous nuclear reactor system comprising in combination a sealed reactor vessel defining a cylindrical cavity therein, a quantity of an aqueous nuclear fuel in the lower part of said cavity sufficient to sustain a condition of nuclear criticality and filling said lower part of said cavity to a height approximately equal to the diameter of said cavity, heat exchanger means in said lower part of said cavity, a ring shaped hollow cylindrical coolant member in the upper part of said cavity, the outer wall of said coolant member being of smaller diameter than the diameter of said cavity to define therewith an annular spray condensing passage, said coolant member extending down from the top over a substantial portion of the height of said cavity and terminating above the upper surface of said fuel to define therebetween a vapor region extending across said cavity, the inner wall of said coolant member defining a reflux condenser channel contiguous with said vapor region, a first coolant means in said reflux condenser channel, said inner wall of said coolant member and said coolant means therein defining a return vapor passage extending from the top of said reflux condenser channel to said vapor region, means for circulating coolant through said coolant member, a second coolant means located in said spray condensing passage, said second means being disposed to define an exit vapor passage extending from said vapor region to the top of said cavity, means external to said vessel for the catalytic recombination of hydrogen and oxygen escaping from said fuel as a result of radiolytic dissociation, said recombination means having an input connected to the upper end of said vapor exit passage and an output connected to the upper end of said return vapor passage and including means for circulating vapors, a baffle in said vapor region below the lower end of said vapor return passage for directing vapors across the bottom of said coolant member to the lower end of said vapor exit passage, and means outside said vessel for circulating coolants through said heat exchanger, said coolant member, and said first and second coolant means.

2. The reactor system of claim 1 in which said first and second coolant means are spiral coils.

References Cited in the file of this patent

UNITED STATES PATENTS

| | | |
|---|---|---|
| 2,198,795 | Titlestad | Apr. 30, 1940 |
| 2,338,346 | Mather | Jan. 4, 1944 |
| 2,774,730 | Young | Dec. 18, 1956 |
| 2,780,596 | Anderson | Feb. 5, 1957 |
| 2,825,688 | Vernon | Mar. 9, 1958 |

OTHER REFERENCES

AECD-3287, Los Alamos Homogeneous Reactor, SUPO Model, L. D. P. King, February 7, 1952. Available in Office of Technical Services, Dept. of Commerce, Wash. 25, D.C.

AEC Document LA-1337, issued March 6, 1952, Bunker et al., pages 13, 14.

AEC Document CF-54-6-180, June 23, 1954, declassified December 19, 1955, Visner, pages 6 and 7.